A. KIMBLE.
VENTILATED PULLEY.
APPLICATION FILED APR. 23, 1921.
1,433,828.
Patented Oct. 31, 1922.
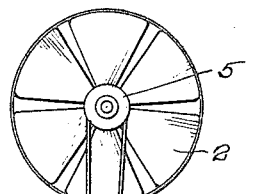
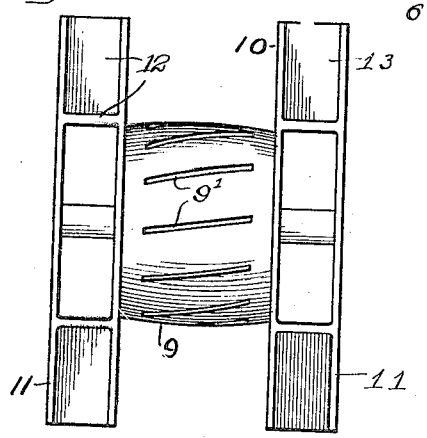
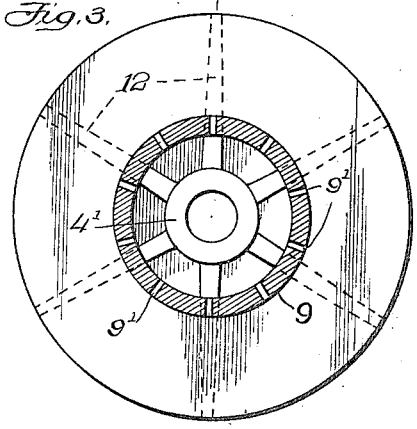
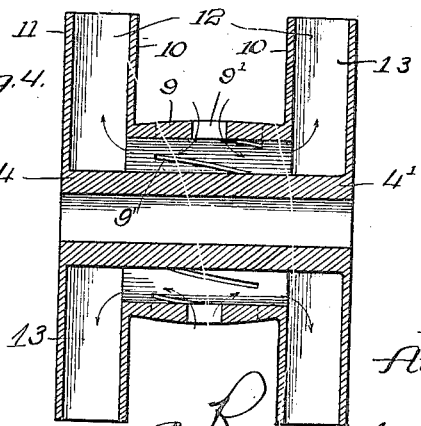
Inventor:
Austin Kimble, Patented Oct. 31, 1922.

1,433,828

UNITED STATES PATENT OFFICE.

AUSTIN KIMBLE, OF WAUSAU, WISCONSIN, ASSIGNOR TO MARATHON ELECTRIC MFG. CO., OF WAUSAU, WISCONSIN, A CORPORATION OF WISCONSIN.

VENTILATED PULLEY.

Application filed April 23, 1921. Serial No. 464,029.

*To all whom it may concern:*

Be it known that I, AUSTIN KIMBLE, a citizen of the United States of America, and a resident of Wausau, county of Marathon and State of Wisconsin, have invented certain new and useful Improvements in Ventilated Pulleys, of which the following is a specification.

This invention relates primarily to air cooled and artificially ventilated power transmission pulleys, and indirectly to speed regulation of belted motor-driven devices and means to manually adjust regulation of the speed of a driven device by means of variable belt tension, especially in connection with constant speed motors such for instance as alternating current motors of either synchronous or induction type.

The main objects of the invention are to provide an improved form of draft generating pulley adapted for self-ventilation and consequent cooling sufficient to avoid detrimental heating when subjected to extension belt slippage; to provide a high speed motor with such a pulley adapted to prevent generation and transmission of heat to and consequent over-heating of the motor; to provide such a pulley in a form adapted to intimately relate the cooling draft to the belt face or crown part; to provide for adjustable belt slippage with such a pulley whereby the speed of the driven machine may be varied relative to the speed of a motor by means of varying the belt slippage by a suitable belt tightener.

This invention is distinguished as to structure from the device of my Patent No. 1,372,700 of March 29, 1921, from the device of my Patent No. 1,388,865 of August 30, 1921, and from my copending application having the Serial No. 468,933, and the following claims are limited to the present disclosure as distinct from said patents and other application.

An illustrative embodiment of this invention is shown in the accompanying drawings, in which—

Figure 1 is a front elevation of a belt-connected motor and fan.

Fig. 2 is a side elevation of the ventilated pulley.

Fig. 3 is a section through said pulley on the line 3—3 of Fig. 2.

Fig. 4 is an axial section of the pulley on the line 4—4 of Fig. 3.

In the construction shown in the drawings, the motor 1 is operably connected to the fan 2 by means of the belt 3, said motor being provided with a pulley 4, and the fan being provided with a pulley 5 to receive said belt. The motor is mounted on an adjustable frame 6 comprising a stationary base part 6′ and a movable part or platform 7 adapted and arranged for vertical movement by adjustable means 8 in the form of a screw and hand-wheel, said parts 6′ and 7 being hinged together at one side as indicated at 7′. The driven pulley is so positioned relative to the motor pulley, that movement of the screw 8 varies the tension of the belt by reason of changing the distance between the pulley centers. Turning the screw 8 backward or counter-clockwise lowers the motor 4 and tightens the belt thereby decreasing slippage and increasing the speed of the fan, and vice versa.

It will be apparent that if the motor is adapted for constant speed and the driven device is in the form of a fan or other constant load mechanism, the tension of the belt may be adjusted to run the driven device at any constant speed desired less than its maximum speed. The self-ventilated draft generating pulley 4 comprises a hub 4′, a crown rim 9 secured thereto as will be described, radial flanges 10 formed on the front and back sides of rim 9, radial flanges 11 formed on the front and rear ends of the hub 4′, and fan blades 12 radially disposed between said flanges 10 and 11 at each end. A peripheral series of air inlet openings 9′ being provided in the rim 9, and a plurality of radial air draft passages 13 being disposed at both ends between said flanges 10 and 11 whereby, in operation, a strong draft of air is drawn through the perforated pulley rim 9 and discharged radially past the blades 12. The blades 12 extend from the hub 4′ to the outer edges of the flanges 10 and 11 and are cast integrally therewith and support the flanges 10 and rim 9.

The operation of the pulley is apparent from the drawings, and the direction of the induced draft current is indicated by arrows. The air enters at the slots 9″ relatively near the axis and is urged divergently toward the ends of the hub and is thrown outward centrifugally by the blades or vanes 12.

The motor pulley is usually smaller than the driven pulley, and hence the slippage naturally occurs at the motor end of the belt, but in case the driven pulley is the smaller, the pulleys are made of such materials that slippage at the motor is assured, for which purpose the driven pulley may have the face of its rim formed of material offering greater surface friction than that of the motor pulley.

It is apparent that if the fan is adjusted for slow speed and correspondingly light load, the tension on the belt will be relatively small and consequently the bearing friction of the motor and fan will be correspondingly small, so that on light loads there is a saving of energy which would otherwise be lost through the bearings of a constantly tight-belted device.

Although but one specific embodiment of this invention has been herein shown and described, it will be understood that numerous details of the construction shown may be altered or omitted without departing from the spirit of this invention as defined by the following claims.

I claim:

1. A pulley comprising a hub, a belt rim and draft generating means to ventilate the pulley, said hub and rim being spaced apart radially to provide a draft passageway, said rim being radially perforated circumferentially and said means including a discoidal hollow fan projecting flange-like radially beyond said rim at one end of said pulley, which fan is formed and arranged to pull air in through said rim and discharge it centrifugally at the outer edge of the fan.

2. A pulley comprising a hub, a perforated belt-rim coaxial therewith and spaced therefrom, a pair of axially spaced flanges at each end, and a plurality of air propelling vanes disposed between and connecting each pair of adjacent flanges, the chamber between the hub and rim being continuous with the chambers between the flanges at each end.

3. A pulley comprising a hub, a perforated belt-rim coaxial therewith and spaced therefrom, a pair of axially spaced flanges at each end, and a plurality of air propelling vanes disposed between and connecting each pair of adjacent flanges, the inner flanges terminating at the edges of the rim, and the outer flanges terminating at the hub, whereby a branched draft passageway is provided extending from the rim face inwardly and divergently and then outwardly.

Signed at Chicago this 21st day of April, 1921.

AUSTIN KIMBLE.